Dec. 3, 1929.　　　H. STACKS　　　1,738,329
VEHICLE BODY CONSTRUCTION
Filed Jan. 17, 1929　　　2 Sheets-Sheet 1
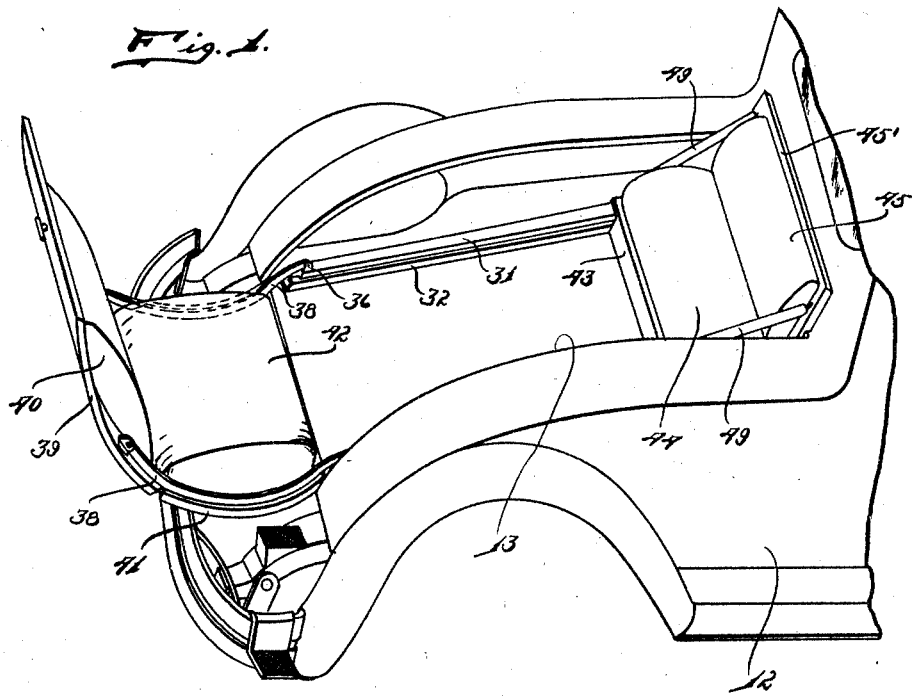
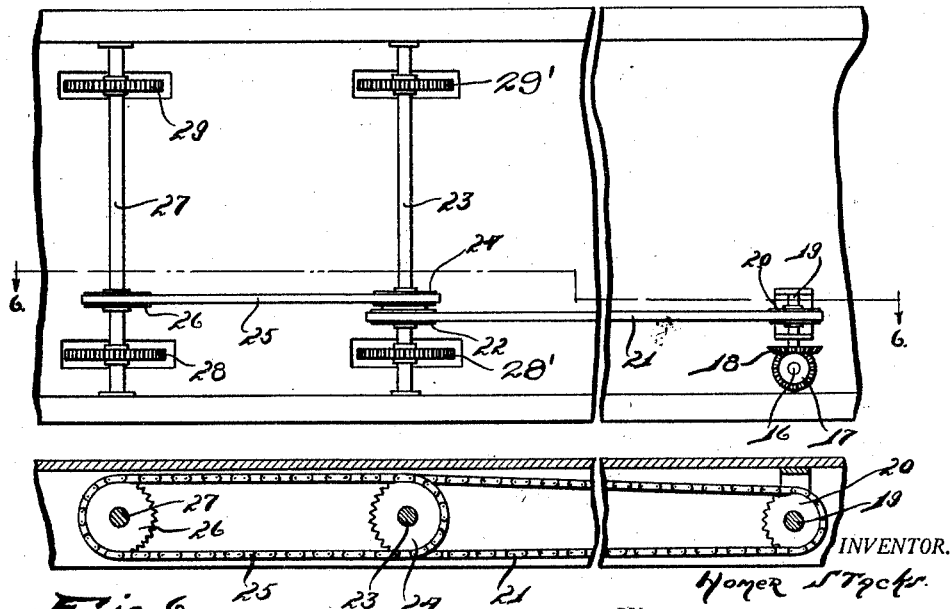
INVENTOR.
Homer Stacks
BY
*Thos. Donnelly*
ATTORNEY

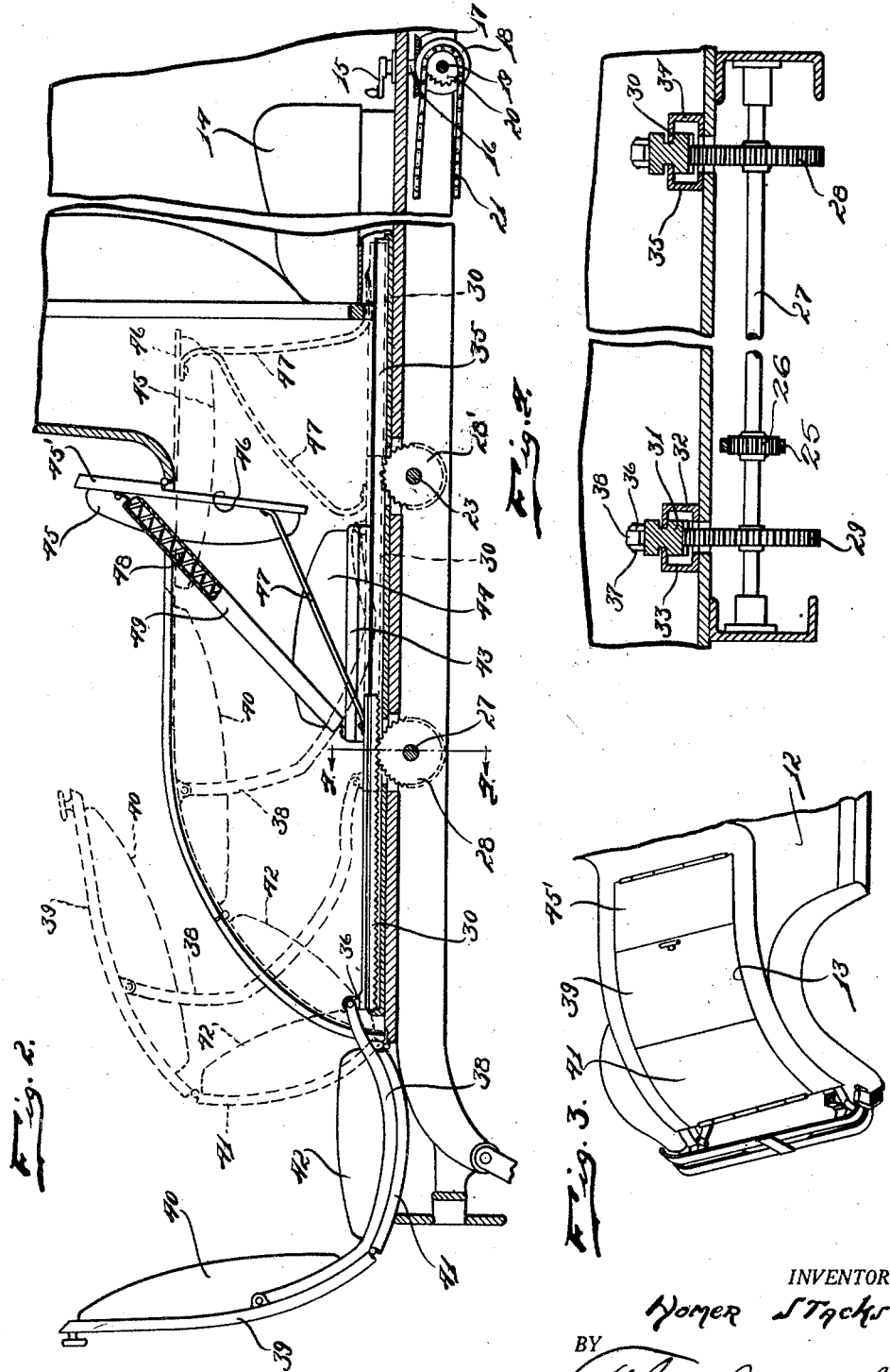

Patented Dec. 3, 1929

1,738,329

UNITED STATES PATENT OFFICE

HOMER STACKS, OF DETROIT, MICHIGAN

VEHICLE BODY CONSTRUCTION

Application filed January 17, 1929. Serial No. 333,067.

My invention relates to a new and useful improvement in a vehicle body construction particularly adapted for use on automobiles of the type in which the well known rumble seat is incorporated.

It is an object of the present invention to provide in a vehicle body of this class, a construction whereby the space usually occupied by the occupants of the rumble seat may be extended to accommodate four passengers.

It is another object of the present invention to provide a body construction of this class which will be simple in structure, economical of manufacture, durable and efficient in use and easily and quickly arranged in either operative or inoperative position.

It is another object of the invention to provide a mechanism for easily and quickly moving the seat forming parts to operative and inoperative position.

Other objects will appear hereinafter.

The invention consists in the combination and arrangement of parts hereinafter described and claimed.

The invention will be best understood from a reference to the accompanying drawings which form a part of this specification, and in which, Fig. 1 is a fragmentary perspective view of a vehicle body showing the invention applied.

Fig. 2 is a fragmentary sectional view showing the invention applied, with parts broken away.

Fig. 3 is a perspective view of the vehicle body with the invention applied and moved to closed position.

Fig. 4 is a sectional view taken on line 4—4 of Fig. 2.

Fig. 5 is a bottom plan view showing the invention applied, with parts broken away.

Fig. 6 is a sectional view taken on line 6—6 of Fig. 5.

The invention is adapted for use with a vehicle body 12 having a rearward positioned cavity 13. Positioned adjacent the front seat 14 of the vehicle body is a crank 15 which is used for rotating the shaft 16 upon which is fixedly mounted a bevel gear 17 meshing with a bevel gear 18 fixedly mounted on a shaft 19. Fixedly mounted on this shaft is a sprocket wheel 20 engaging the chain 21 which also passes around a sprocket wheel 22 fixedly mounted on a shaft 23. A secondary sprocket wheel 24 is fixedly mounted on the shaft 23 and connects by the chain 25 to a sprocket wheel 26 fixedly mounted on the shaft 27. Fixedly mounted on the shaft 27 are gears 28 and 29 adapted to engage rack bars 30 and 31 respectively, which are slidably mounted between tracks 34 and 35 and 32 and 33, respectively. These rack bars are similarly constructed and operate in a similar manner so that a description of one will suffice for both. Projecting upwardly from the rear end of the rack bar 31 are spaced lugs 36 and 37 to which is pivotally connected one end of the arcuate or bowed arm 38, the other end of which is pivotally connected to the seat back forming portion 39 which is upholstered as at 40 and which cooperates with the upholstering 42 on the seat base 41 to provide a rear seat. The width of the seat will of course be limited by the width of the vehicle body with which used but with bodies as now commonly constructed, this width would be sufficient to accommodate two persons comfortably.

A seat base 43 is provided with upholstering 44 which cooperates with the upholstery 45 mounted on the seat back forming portion 45′ to provide another seat. This seat back forming portion 45′ is hingedly mounted upon the body and cut away as at 46 so that when swung into horizontal positions as shown in dotted lines in Fig. 2, rearwardly projecting portions of the seat back 45′ will lie flush with the angularly rearwardly turned portion of the body.

A flexible member 47 serves to connect the inner end of the seat back 45′ to one end of the rack bar 31 and a spring 48 encased in a flexible casing 49 connects the seat back 45′ to the seat base 43 tending normally to move the seat back 45′ into the horizontal position shown in dotted lines in Fig. 2.

In operation, when the various parts are in positions shown in Fig. 2, seating accommodations for four persons will be provided and when desired the various parts may be moved to the position shown in Fig. 3. In moving to this position, the various parts are illustrated in different positions of movement by the dotted lines in Fig. 2. In order to move the parts from the position shown in full lines in Fig. 2, rotation of the crank will effect, through the rotation of the gears 28 and 29, a forward movement of the rack bars 30 and 31, thus permitting the spring 48 to move the member 45' into horizontal position. The pull of the rack bar on the bowed member 38 will swing the members 41 and 39 forwardly until swung into the position shown in Fig. 3. As the rack bar travels along the gears 28 and 29, this rack bar will engage similar gears 28' and 29' fixedly mounted on the shaft 23 and subsequent to engagement of the rack bars with the bars 28' and 29', the rack bars will disengage the rack bars 28 and 29. Consequently, by rotating the shaft 16 in either direction, the seat forming parts may be swung either to operative or inoperative position In this way, I have provided a mechanism whereby the rearward part of the body may be converted for additional seating capacity and whereby the seat forming parts may be easily and quickly moved to either desired position.

While I have illustrated and described the preferred form of my invention, I do not wish to limit myself to the precise detail of structure shown but desire to avail myself of such variations and modifications as come within the scope of the appended claims.

Having thus described my invention, what I claim as new and desire to secure by Letters Patent is:

1. A device of the class described comprising: a vehicle body having a rearwardly projecting portion provided with a cavity therein; a forward seat forming portion mounted stationary in said cavity; a swingably mounted seat back forming portion cooperating with said seat forming portion; resilient means for normally retaining said seat back forming portion in inoperative position; a rack bar; means for connecting said seat back forming portion to said rack bar; and means for moving said rock bar longitudinally, the longitudinal movement of said rack bar in one direction moving said seat back forming portion to upright operative position.

2. A device of the class described comprising; a vehicle body having a rearwardly projecting portion provided with a cavity therein; a forward seat forming portion mounted stationary in said cavity; a swingably mounted seat back forming portion cooperating with said seat forming portion; resilient means for normally retaining said seat back forming portion in inoperative position; a rack bar; means for connecting said seat back forming portion to said rack bar; and means for moving said rack bar longitudinally, the longitudinal movement of said rack bar in one direction moving said seat back forming portion to upright operative position; and rotatable means for actuating said moving means.

3. A device of the class described comprising: a vehicle body having a rearwardly projecting portion provided with a cavity therein; a forward seat forming portion mounted stationary in said cavity; a swingably mounted seat back forming portion cooperating with said seat forming portion; resilient means for normally retaining said seat back forming portion in inoperative position; a rack bar; means for connecting said seat back forming portion to said rack bar; and means for moving said rack bar longitudinally, the longitudinal movement of said rack bar in one direction moving said seat back forming portion to upright operative position; and rotatable means for actuating said moving means; a rear seat forming portion; a seat back forming portion swingably mounted on said rear seat forming portion; and an arcuate arm connecting said last mentioned seat back forming portion pivotally to said rack bar.

4. A vehicle body construction of the class described, comprising; a stationary seat forming member; a swingably mounted seat back forming member; a rearwardly positioned swingably mounted seat forming member; a seat back forming member swingably mounted on said rearwardly positioned seat forming member; resilient means for normally retaining said first mentioned seat back forming member in inoperative position; a rack bar; flexible means for connecting said rack bar to said first mentioned seat back forming member; arcuate means for connecting said second mentioned seat back forming member to said rack bar; a plurality of gears for effecting longitudinal movement of said rack bar; and crank operated means for effecting rotation of said gears.

In testimony whereof I have signed the foregoing specification.

HOMER STACKS.